United States Patent [19]
Fischer

[11] 3,874,403
[45] Apr. 1, 1975

[54] SAFETY ATTACHMENT FOR APPLIANCES SUBJECT TO FLUID LEAKAGE

[76] Inventor: Wayne L. Fischer, 21197 E. Tollhouse Rd., Clovis, Calif. 93612

[22] Filed: Nov. 14, 1973

[21] Appl. No.: 415,779

[52] U.S. Cl................ 137/386, 137/392, 137/557, 134/57 D, 200/61.04, 68/208
[51] Int. Cl............................................. F16k 17/36
[58] Field of Search............ 137/67, 312, 386, 387, 137/557, 392, 594, 558, 595, 597; 200/61.04, 61.05; 68/208; 134/57 D; 340/235, 242

[56] References Cited
UNITED STATES PATENTS

| | | | |
|---|---|---|---|
| 2,531,159 | 11/1950 | Rowell | 137/312 X |
| 3,091,111 | 5/1963 | Cruse et al | 68/208 |
| 3,200,388 | 8/1965 | Uhlig | 200/61.04 X |
| 3,473,553 | 10/1969 | Collins | 137/312 |
| 3,770,002 | 11/1973 | Brown | 137/312 |

*Primary Examiner*—Martin P. Schwadron
*Assistant Examiner*—David R. Matthews
*Attorney, Agent, or Firm*—Huebner & Worrel

[57] ABSTRACT

At attachment for an appliance having a fluid inlet conduit, the attachment having a pipe fitting with oppositely extending couples adapted to be mounted on the conduit so as to link segments thereof in fluid transferring relation and having an internal valve seat disposed between the couplings; a solenoid mounted on the fitting, a valve closure borne by the solenoid for movement to and from the valve seat; a fluid sensitive switch positioned for exposure to fluid leakage from the appliance; and an electrical circuit including a power source interconnecting the switch and the solenoid in controlling relation.

10 Claims, 5 Drawing Figures

PATENTED APR 1 1975 3,874,403

SAFETY ATTACHMENT FOR APPLIANCES SUBJECT TO FLUID LEAKAGE

BACKGROUND OF THE INVENTION

The present invention relates to an appliance attachment and more particularly to such an attachment for appliances subject to fluid leakage and which is adapted to prevent damage or destruction of linoleum, carpeting, flooring, wall paneling, and the like as a result of leakage of fluids from such appliances.

The prior art, as represented by the Montgomery U.S. Pat. No. 2,043,857; the Hampson U.S. Pat. No. 2,372,489; the Carver et al. U.S. Pat. No. 2,798,503; and the Collins U.S. Pat. No. 3,473,553, relates primarily to leakage detectors of rather complex structure and delicate operation. Such detectors suffer from deficiencies which the attachment of the present invention is adapted to overcome.

There is a latent danger in the use of appliances, such as dishwashers, clothes washers, water heaters, and the like, in that over a period of prolonged use, normal attrition causes wearing of the associated fluid conduits and loosening of their fittings as well as rust, corrosion and the like resulting in the leakage of fluid, such as water, therefrom. The conduits and fittings are conventionally located in concealed locations behind and under the appliances. Therefore, in the typical situation, leakage is not detected until a conduit ruptures or a fitting gives way so as to cause flooding from under the appliance. There is no warning value in this flooding since the insidious, seemingly insignificant but prolonged leakage prior to such flooding causes massive damage even before detection. Although seemingly minuscule in quantity, the water seeps into seams and cracks in the flooring so as to cause a progressive deterioration of the flooring beneath the appliances. Although a linoleum or tile surface may delay initial damage to the flooring, prolonged leakage on linoleum or tile has a corrosive affect which eventually permits seepage into the flooring below. In fact, such surfaces may aggravate the situation by preventing the normal evaporation of water which has seeped through the linoleum or tile surface to the flooring and supporting structure below.

Virtually every home and business structure has had significant water damage to flooring, linoleum, wall paneling, carpeting or the like at some period since there has heretofore been no convenient and practical means for preventing such damage. The problem has been so prevalent and the repairs so expensive that many home and business insurance policies exclude coverage for water damage and many leases limit the types of appliances that can be used or restrict their locations. It is estimated that the average cost of repairing damage done by leakage from appliances, such as dishwashers, is approximately five hundred dollars for each instance of leakage. Furthermore, prior art warning devices have not proved to be effective in eliminating these problems. They have not been capable of detecting minor, but damaging leakage. They have not lent themselves to installation on existing appliances. They either have not been capable of terminating fluid flow to the appliances or have been ineffectual in doing so, and they have been expensive and difficult to operate.

Therefore, it has long been recognized that it would be desirable to have an attachment for appliances which would operate dependably to detect even minor leakage from such appliances reacting automatically to terminate fluid flow to the appliances when such leakage is detected and which is of minimal expense and possesses the capability of ease of installation on existing appliances of all types.

SUMMARY OF THE INVENTION

It is therefore an object of the present invention to provide an improved appliance attachment to preclude fluid damage due to leakage.

Another object is to provide such an attachment which alerts the owner to even minor leakage from an appliance.

Another object is to provide such an attachment which operates automatically upon the detection of leakage from an appliance to terminate the flow of fluid to the appliance.

Another object is to provide such an attachment which eliminates water damage caused by leakage from an appliance.

Another object is to provide such an attachment which can easily be installed by the owner on an existing appliance.

Another object is to provide such an attachment which remains operable throughout the life of the appliance on which it is installed without maintenance.

Another object is to provide such an attachment which alerts the owner to the fact that fluid flow to the appliance has been terminated.

Another object is to provide such an attachment which can quickly be reset for operation after the detection and termination of leakage.

A further object is to provide such an attachment which can be purchased at minimum expense and is adaptable for use on a wide variety of types of appliances.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
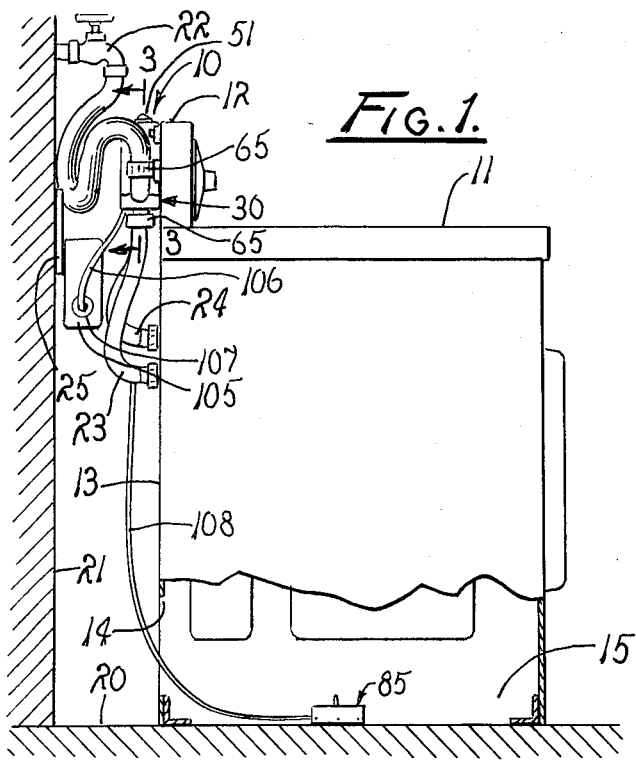
FIG. 1 is a fragmentary side elevation showing the attachment of the present invention installed in its operative environment on an appliance.

Referring more particularly to the drawing, the appliance attachment of the present invention is generally indicated by the numeral 10. In FIG. 1, the attachment is shown mounted on an appliance 11, in this case a clothes washer. The appliance has an upper edge 12 and a sheet metal back wall 13 having a back opening 14 therein. The appliance has a lower interior chamber 15.

As shown in FIG. 1, the appliance 11 is positioned in rested engagement on a floor 20 adjacent to a wall 21. A pair of faucets 22 are mounted on the wall. One faucet is connected in the conventional manner to a source of unheated water and the other is connected to a source of heated water, not shown. A hot water inlet conduit 23 operably interconnects the hot water faucet and the appliance extending through the back wall 13. A cold water inlet conduit 24 operably interconnects the cold water faucet and the appliance, also extending through the back wall. An electric outlet 25 is mounted on the wall and connected through the conventional wiring to supply electrical current.

Figure 2:
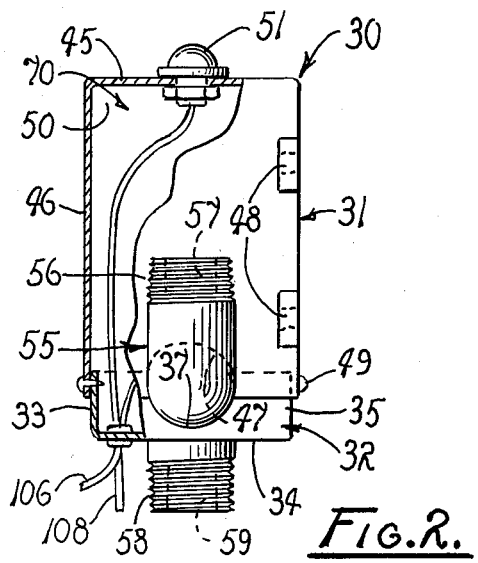
FIG. 2 is a fragmentary side elevation of a valve assembly of the attachment.
Figure 3:
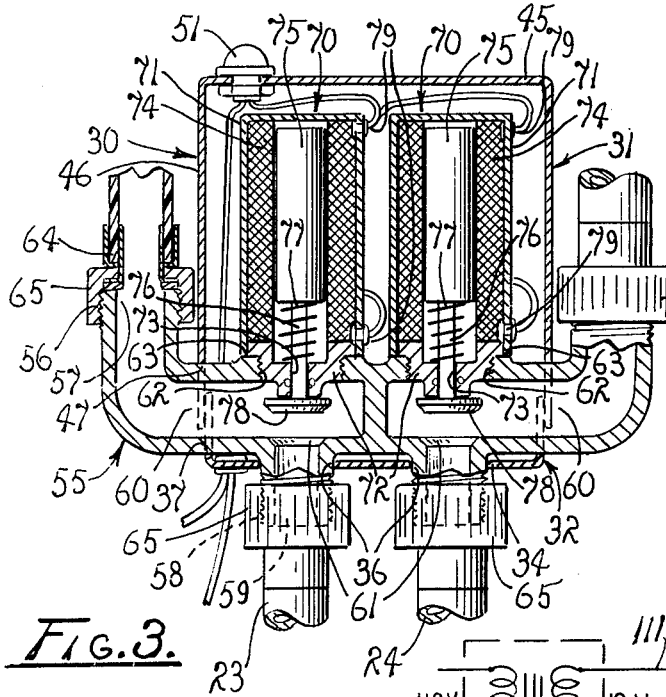
FIG. 3 is a longitudinal vertical section taken on line 3—3 in FIG. 1.

The appliance attachment 10 has a fluid shut off valve assembly 30 shown in FIGS. 2 and 3. The valve assembly includes a housing 31 composed of a base portion 32 and a cover portion 33. The base portion has a substantially rectangular central panel 34 having an integral peripheral side panel extending substantially normal thereto. The central panel of the base portion has a pair of openings 36 therein in spaced relation. The endward portions of the side panel individually have semi-circular notches 37 formed therein, as best shown in FIG. 2.

The cover portion 33 of the housing 31 consists of a substantially rectangular central panel 45 having an integral peripheral side panel 46 extending substantially normal thereto. The endward portions of the side panel individually have semicircular notches 47 therein remote from the central panel, as best shown in FIG. 2. A pair of ears 48 are individually borne by each of the endward portions of the side panel extending outwardly therefrom, as shown in FIG. 2. The base and cover portions 32 and 33 respectively of the housing 31 are retained in engagement, as shown in FIGS. 2 and 3 by several screws 49 so as to form the housing and defining an interior 50 therefore. A protruding signal light 51 is secured in the central panel of the cover portion of the housing.

A pipe fitting or manifold 55 is mounted in the interior 50 of the housing 31 of the valve assembly 30. The manifold has a pair of opposite, angularly bent screw-threaded couplings 56 having inlet ports 57. A pair of screw-threaded couplings 58 are integrally borne by the manifold extending in substantially parallel relation in the opposite direction to the couplings 56 and individually having outlet ports 59. It is not essential that the couplings 56 and 58 be screw-threaded. Thus, the couplings can be of a substantially smooth configuration having one or more peripheral sealing ribs, not shown. However, the screw-threaded configuration shown in the drawing is preferred for reasons subsequently to be made more clearly apparent.

The manifold 55 has a pair of separate and distinct internal fluid chambers 60 individually interconnecting corresponding inlet and outlet ports, as best shown in FIG. 3. The manifold within each chamber is beveled to form an annular valve seat 61 individually circumscribing respective outlet ports. A pair of internally screw-threaded bores 62 are formed in the manifold in individual communication with each of the fluid chambers and in axial alignment with the annular valve seat thereof. Externally of the manifold and circumferentially of each of the screw-threaded bores is a sealing surface 63. The manifold is fitted within the housing 31 so that the couplings 56 extend outwardly through the semi-circular notches 37 and 47 and the couplings 58 individually extend through the pair of openings 36 of the base portion 32 of the housing, as shown best in FIG. 3. Thus, the bores 62 are enclosed in the interior 50 of the housing.

As will subsequently be described, the inlet conduits 23 and 24 are individually severed to form severed ends 64. Suitable couplings 65 are employed individually to secure the severed ends of each conduit to the respective couplings 56 and 58 in fluid transferring relation, as shown in FIG. 3.

A pair of solenoids 70, each having a cylindrical case 71 with a screw-threaded mounting portion 72, are screw-threadably mounted in the bores 62 of the manifold 55 so as to engage their respective sealing surfaces 63 in fluid-tight engagement. The mounting portion of each solenoid is pierced longitudinally by a rod passage 73 communicating with its respective fluid chamber 60 of the manifold in axial alignment with its respective valve seat 61. A cylindrical electrical coil 74 is housed within the case 71 of each solenoid in the conventional manner about a plunger or armature 75. A rod 76 is extended from each armature through its respective rod passage in fluid tight relation. A compression spring 77 releasably retains the armature and rod of each solenoid in a retracted position, shown in FIG. 3. A valve closure 78 is borne by the remote end of each of the rods within its respective fluid chamber. Electrical connections 79 are secured on the exterior and at the opposite ends of each of the solenoid cases connected in the conventional manner to the coil of the solenoid.

Figure 4:
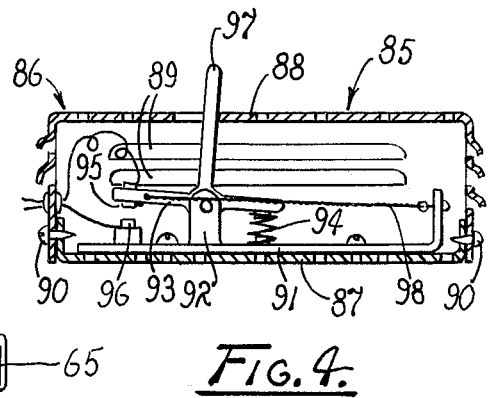
FIG. 4 is a longitudinal vertical section of a fluid sensitive switch of the attachment.

A fluid sensitive switch 85 is shown in FIGS. 1 and 4. As will subsequently become more clearly apparent, the switch may be of any suitable type adapted to be actuated by fluids such as water, oil, liquid detergent and the like. However, the switch disclosed is believed to have significant operative advantages. The switch has a housing 86 providing a base portion 87 and a cover portion 88. Both portions of the housing have a plurality of louvered openings 89. The base and cover portions of the housing are retained in the assembled relation shown in FIG. 4 by several interconnecting screws 90.

An elongated bracket 91 is secured on the base portion 87 within the housing 86. A fulcrum member 92 is borne by the bracket in upstanding relation adjacent to the center of the bracket. A lever member 93 is pivotally fastened on the fulcrum member. A compression spring 94 interconnects one end of the lever member and the bracket resiliently to urge the lever member in a counterclockwise direction, as viewed in FIG. 4. A first electrical contact 95 is borne by the end of the lever member opposite to the spring. A second electrical contact 96 is affixed on the bracket adjacent to the first electrical contact for selective engagement therewith. A reset arm 97 is mounted on the lever member and extended upwardly through the cover portion 88 of the housing. A suitable fluid responsive member 98, such as wound human hair, interconnects the lever member adjacent to the first electrical contact and the bracket remote therefrom, as best shown in FIG. 4. The member normally retains the lever member 93 in the position shown in FIG. 4 against pressure of the spring. However, in or near a fluid environment the member elongates to permit the electrical contacts to engage. It should be noted that the member has operative characteristics which permit expansion only in direct or near contact with fluid such as water or a similar liquid and not in moisture such as steam which may be given off by the appliance.

In its preferred embodiment, the appliance attachment 10 is adapted to operate at low voltage, such as in the conventional 12 volts systems. For this purpose, a conventional step-down transformer 105, capable of reducing the voltage of electrical current transmitted therethrough from 110 to 12 volts, is adapted operatively to be positioned in engagement with the electric outlet 25. The attachment mounts an insulated cord 106 connected to the base portion 32 of the housing 31 and having an electric plug 107 at the remote end thereof adapted for connection to the transformer. A second insulated cord 108 interconnects the base portion of housing 31 and the housing 86 of the fluid sensitive switch 85.

Figure 5:
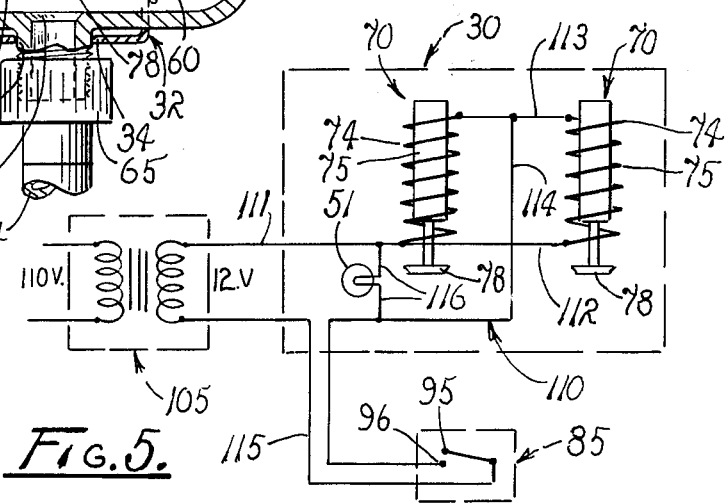
FIG. 5 is a schematic diagram of an electrical circuit of the attachment.

The attachment has an electrical circuit 110 schematically illustrated in FIG. 5 interconnecting the secondary of the transformer 105, the valve assembly 30 and the fluid sensitive switch 85 in series. The electrical circuit is composed of a first electrical conductor 111 connected in the conventional manner to the electrical plug 107 and extended through the insulated cord 106 and into the interior 50 of the housing 31 of the valve assembly 30. A second electrical connection 112 connects the first electrical conductor with predetermined corresponding electrical connections 79 of the solenoids 70. A third conductor 113 interconnects the opposite corresponding electrical connections 79 of the solenoids. A fourth electrical conductor 114 connects the electrical conductor 113 with the first electrical contact 95 of the fluid sensitive switch 85 extending through the insulated cord 108. A fifth electrical conductor 115 is connected to the second electrical contact 96 and extends through the insulated cord 108 to the valve assembly 30, then through the insulated cord 106 and is wired in the conventional manner to the electric plug. A pair of sixth electrical conductors 116 individually interconnect the electrical conductors 111 and 114 to the signal light 50 within the housing 31. Thus, the solenoids 70 are wired in parallel and the signal light 51 is wired in parallel with the solenoids.

OPERATION

The operation of the described embodiment of the subject invention is believed to be clearly apparent and is briefly summarized at this point. As previously noted, the appliance attachment 10 can be sold as an integral part of the appliance 11 with which it is to be operated. However, the attachment is designed also to be marketed separately from the appliance for installation on existing appliances. Such installation is readily accomplished by first mounting the valve assembly 30 on the back wall 13 of the appliance 11 adjacent to the upper edge 12 so that the signal light 51 is visible from in front of the appliance. The valve assembly is mounted by the use of suitable sheet metal screws, not shown, received through the ears 48 of the cover portion 33 of the housing and screw-threaded into the back wall of the appliance, as shown in FIG. 1.

Subsequently, as previously described, the inlet conduits 23 and 24 are severed substantially centrally thereof to define severed ends 64, as shown in FIGS. 1 and 3. The severed ends of each conduit are then connected to the couplings 56 and 58 of the manifold 55, as shown in FIG. 3. This is accomplished by any suitable coupling device such as by fitting the severed ends of the conduit about their respective couplings and securing them in position through the use of conventional circumscribing clamps, not shown. However, as shown in FIGS. 1 and 3, conventionally available, internally screw-threaded couplings 65 are fastened on the severed ends of the conduit and screw-threadably mounted on the respective couplings 56 and 58 so as to ensure a fluid tight engagement. Such conventional couplings are adapted individually to be attached to the severed ends of the conduits by compressing preselected portions thereof about the severed ends, using a pliers or similar tool, so as rotationally to mount the internally screw-threaded portions thereof on their respective severed ends of the conduits, as shown in FIG. 3. Thus, the valve assembly is attached to the back wall 13 of the appliance 11 as described; the conduits are severed to form severed ends 64; an internally screw-threaded coupling is attached to each severed end by compressing the preselected portion thereof about the conduit in binding relation; and the rotational internally screw-threaded portion of each coupling is thereafter screw-threadably secured in fluid transferring relation on its respective coupling 56 or 58 to connect the inlet conduits with the appliance in parallel through the valve assembly, as shown in FIG. 3.

Subsequently, the fluid sensitive switch 85 is positioned beneath the appliance 11 in a position most susceptible to leakage from the appliance. As shown in FIG. 1, this will normally be within the lower interior 15 of the appliance in rested relation on the floor 20. Such positioning is permitted by inserting the switch through the back opening 14 of the appliance. Where no such opening is present, the fluid sensitive switch can be positioned with equal effectiveness on the floor between the back wall 13 of the appliance and the wall 21 so that it is out of sight. The electric plug 107 is then simply connected to the transformer 105 in order to make the attachment operational.

During normal operation of the appliance, the fluid sensitive member 98 retains the first and second electrical contacts 95 and 96 in separated relation, as shown in FIG. 4. Consequently, no electrical current is permitted to flow through the electrical circuit 110. However, in or near fluid, the member 98 extends longitudinally to allow the compression spring to position the electrical contacts 95 and 96 in engagement thereby completing the electrical circuit through the contacts. As previously discussed, the member is not responsive to moisture such as steam which may be given off during normal operation of the appliance, particularly since such heated moisture rises above the appliance. However, the member is responsive to direct or near contact with such fluid in the form of pooled water or a similar liquid. Thus, as can be seen in FIG. 5, electrical energy can flow through the circuit 110 only when fluid is detected by the switch.

When the circuit 110 has been completed, the solenoids 70 are energized to motivate their respective armatures 75 to the extended position against their respective springs 77. Accordingly, the valve closures 78 are positioned in fluid tight engagement with the annular valve seats 61 of their respective fluid chambers 60 so as to terminate the flow of water through the inlet conduits 23 and 24 into the appliance. The circuit is simultaneously completed in parallel through the signal light 51 which thereby illuminates to alert the owner of the appliance that moisture is present on the floor 20 and that the flow of water through the inlet conduits has been terminated.

Subsequently, the owner repairs the appliance 11 to eliminate the leak detected by the fluid sensitive switch 85 and, of course, removes the water accumulated on the floor 20. Thereafter, all that is required to again place the attachment in its normal operative configuration is to move the reset arm 97 to the position shown in FIG. 4 so as to again separate the electrical contacts 95 and 96. It will be seen that in a dry environment, after removal of the accumulated water, the fluid responsive member 98 will ultimately contract to its normal length. It has been found that the "over center" connection of the fluid responsive member to the lever member 93, as shown in FIG. 4, sometimes impedes contraction of the member sufficiently to pull the contact 95 out of engagement with contact 96. Therefore, the reset arm is provided permitting movement of the lever member against pressure of the spring 94 to assist in separating the contacts and to permit full contraction of the member. After such full contraction, the member can again retain the contacts in the separated relationship against pressure of the spring. Depending upon the particular type of fluid sensitive member employed, varying periods of time, usually brief, are required in order to permit such contraction of the member. It is again emphasized, however, that other fluid sensitive devices could also be employed.

It will be noted that the attachment 10 has application to a variety of appliances which utilize fluid during operation. Such application is possible to appliances including clothes washers, dishwashers, water heaters, and the like. The specific structure of the valve assembly 30 can, of course, be varied for connection of only one conduit or for connection of more than two conduits as required by the specific design of the appliance for which it is designed. While the attachment is obviously adaptable for use in detecting and terminating the flow of a variety of types of fluids and in other operative environments, it is primarily intended for use in detecting water leakage from appliances. Where the aesthetic valve of the appliance is of significance such as with a dishwasher located in a kitchen area, the attachment can be mounted on the appliance in an entirely obscured location. In this case, the signal light 51 can be mounted on the face of the machine with the remainder of the attachment obscured from view.

Similarly, as previously noted, the fluid sensitive switch 85 can be of a variety of types. However, that shown in FIG. 4 is believed to possess particular utility in that it does not require the presence of large pools of water, as do many prior art devices, before the attachment is actuated. Thus, a very slow leak can be detected by the switch so as to preclude damage to the floor and surrounding surfaces. Similarly, the switch facilitates use in that it can be easily reset for operation without the necessity of supplying any new elements therefor, such as a water soluable wafer as in the case of some prior art devices.

Therefore, the attachment of the present invention operates dependably to detect even minor leakage from appliances reacting automatically to terminate fluid flow to the appliances when such leakage is detected, is of minimal expense to manufacture and purchase, requires little or no maintenance, and possesses the capability of being readily installed on existing appliances of all types.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by letters patent is:

1. An attachment for an appliance having a fluid inlet conduit, the attachment comprising a fluid shut off valve assembly; means for mounting said valve assembly on the conduit in fluid flow controlling relation thereto; fluid leakage sensing means for placement adjacent to the appliance, said sensing means including a switch resiliently urged to a closed attitude, said switch being maintained in a normally open attitude by a member which is responsive to fluid to allow resilient closure of the switch in the presence of fluid; and power means interconnecting the valve assembly and the sensing means for closing the valve assembly to terminate fluid flow through the conduit upon sensing of the presence of fluid by said sensing means.

2. The attachment of claim 1 in which the valve assembly includes a fitting having opposite, conduit engaging couplings and said valve assembly includes a valve closure and seat mounted internally of the fitting and intermediate the couplings connected to the power means for fluid sealing engagement upon closure of the switch.

3. The attachment of claim 2 in which the valve closure is borne by a solenoid on the fitting energizable to position the closure in fluid tight engagement with the valve seat, and said power means includes a source of electrical energy and an electrical circuit connecting in series the switch, source and solenoid.

4. An attachment for an appliance having a fluid inlet conduit, the attachment comprising a fluid shut off valve assembly; means for mounting said valve assembly on the conduit in fluid flow controlling relation thereto; fluid leakage sensing means for placement adjacent to the appliance, said sensing means including a switch, resilient means urging the switch closed, and fluid sensitive means connected in opposition to the resilient means to hold the switch open when the sensing means is unaffected by the presence of fluid but to permit the resilient means to close the switch when the sensing means detects the presence of fluid; and power means interconnecting the valve assembly and the sensing means for closing the valve assembly to terminate fluid flow through the conduit upon the sensing of the presence of fluid by said sensing means.

5. In an appliance having a fluid inlet conduit, the combination of a pipe fitting having oppositely extending couplings engaging the conduit in fluid transferring relation and an internal valve seat disposed between said couplings, a valve closure, means mounting the closure in the fitting and energizable for movement of the closure between a normal position retracted from the seat and a sealed position in engagement with the valve seat, a fluid sensitive switch, and an electrical circuit interconnecting the switch and mounting means to energize the mounting means upon sensing of the presence of fluid by the switch.

6. The combination of claim 5 in which a signal light is connected to the circuit in parallel to the mounting means.

7. An attachment for controlling fluid flow through a conduit upon the detection of fluid leakage, the attachment comprising a fluid manifold having a pair of individual fluid chambers, each chamber communicating with the exterior of said manifold through conduit engaging inlet and outlet ports respectively and having a valve seat disposed therein intermediate the ports; a pair of solenoids mounted on the manifold, each solenoid having a normally retracted rod having a remote end extending into its respective chamber of the manifold in substantial axial alignment with the valve seat of the chamber; a valve closure borne by the remote end of each rod; a switch having electrical contacts; a spring mounted on the switch resiliently to urge the contacts into engagement; a source of electrical energy; an electrical circuit interconnecting the solenoids in parallel and the solenoids with the source, and the contacts in series; and a member mounted on the switch normally maintaining the contacts thereof in spaced relation and subject to being overridden by the spring in the presence of fluid.

8. The attachment of claim 7 in which a signal light is connected to the electrical circuit in parallel with the solenoids.

9. A valve assembly comprising a housing having a plurality of fluid passages therethrough, a valve seat circumscribing each passage, a valve closure individual to each seat, means mounting each closure for movement to and from its respective seat, resilient means individual to each closure urging its respective closure from its seat, and means connected to each closure adapted when actuated to force the closures against their seats in opposition to the resilient means.

10. The valve assembly of claim 9 in which the forcing means are electrical solenoids connected to the respective closures, and including an electrical circuit interconnecting the solenoids for simultaneous actuation.

* * * * *

UNITED STATES PATENT OFFICE
CERTIFICATE OF CORRECTION

Patent No. 3,874,403     Dated April 1, 1975

Inventor(s) Wayne L. Fischer

It is certified that error appears in the above-identified patent and that said Letters Patent are hereby corrected as shown below:

[57] ABSTRACT, line 1 before "attachment" delete "At"

and insert ---An---.

Same Column, line 3 after "extending" and before "adapted"

delete "couples" and insert ---couplings---.

Signed and sealed this 27th day of May 1975.

(SEAL)
Attest:

RUTH C. MASON
Attesting Officer

C. MARSHALL DANN
Commissioner of Patents
and Trademarks